Nov. 18, 1969    J. ALLEAUME    3,479,484
METHOD AND APPARATUS FOR GUIDING A TORCH IN LAP WELDING
Filed April 4, 1967    3 Sheets-Sheet 3
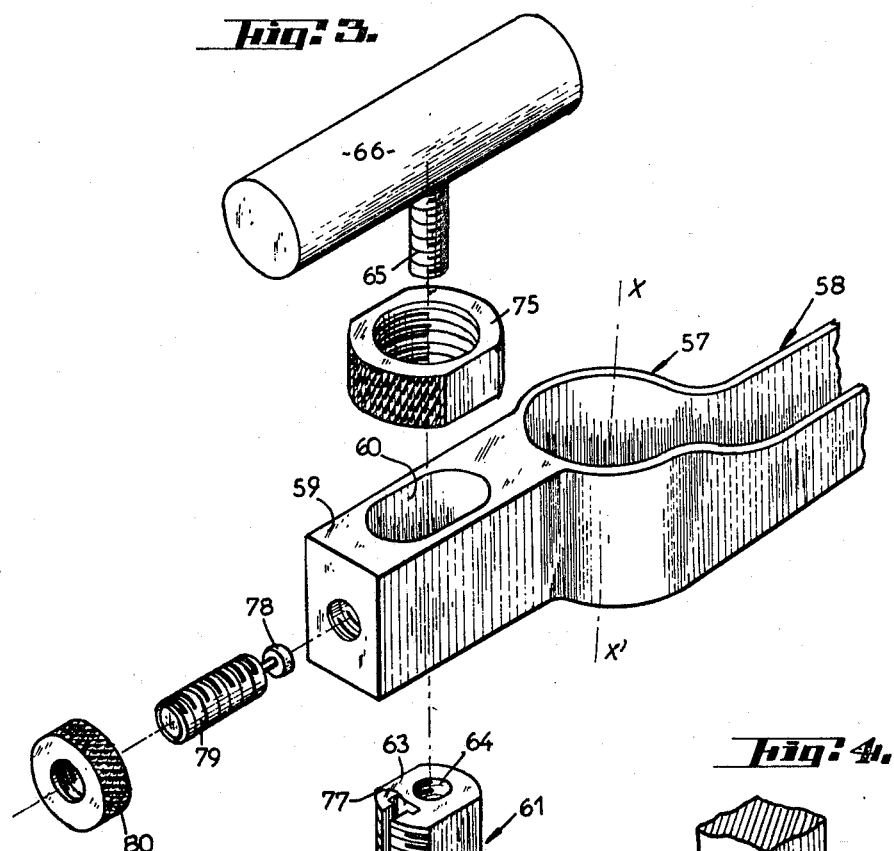
INVENTOR
JEAN ALLEAUME
BY Nolte & Nolte
ATTORNEYS

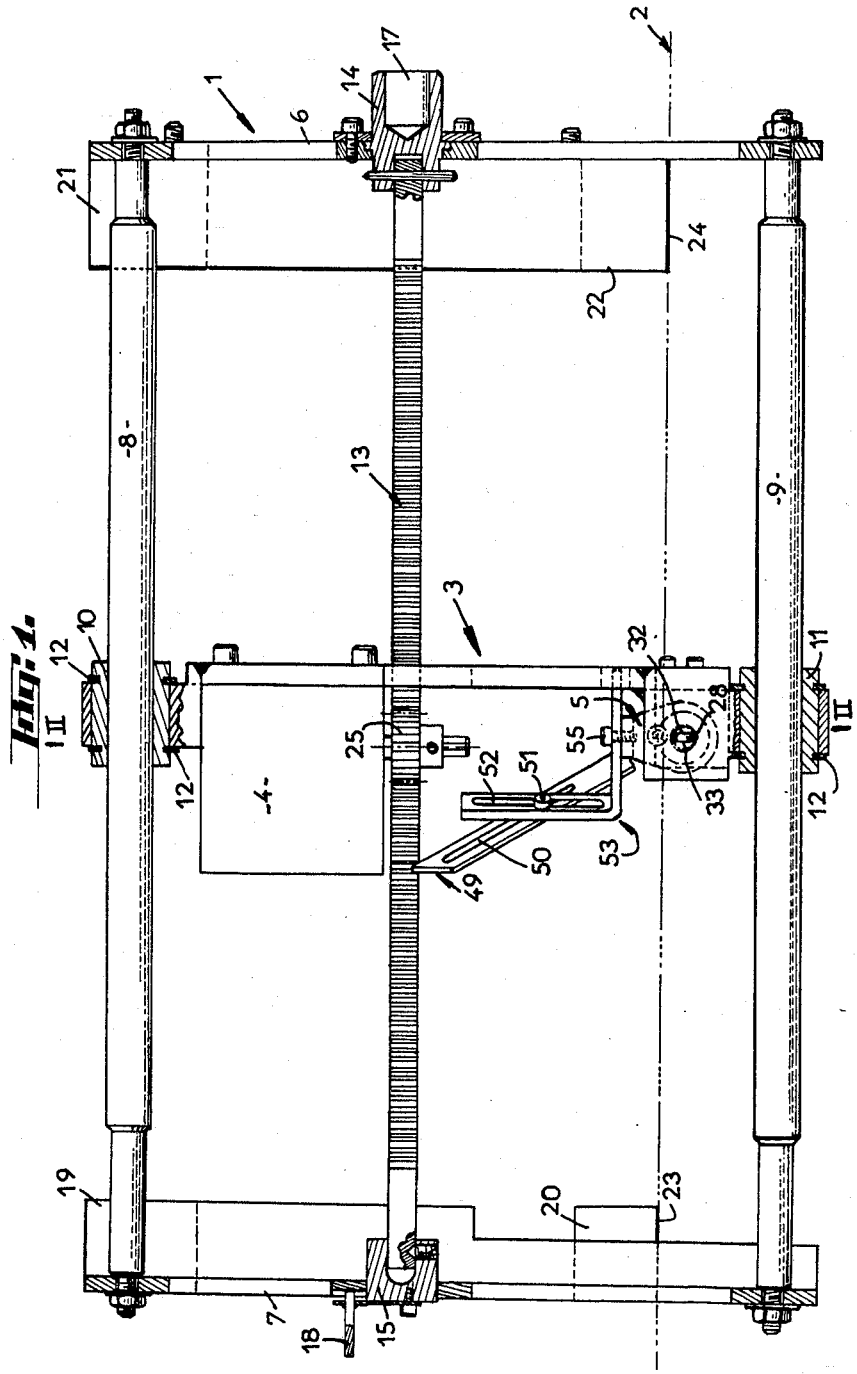

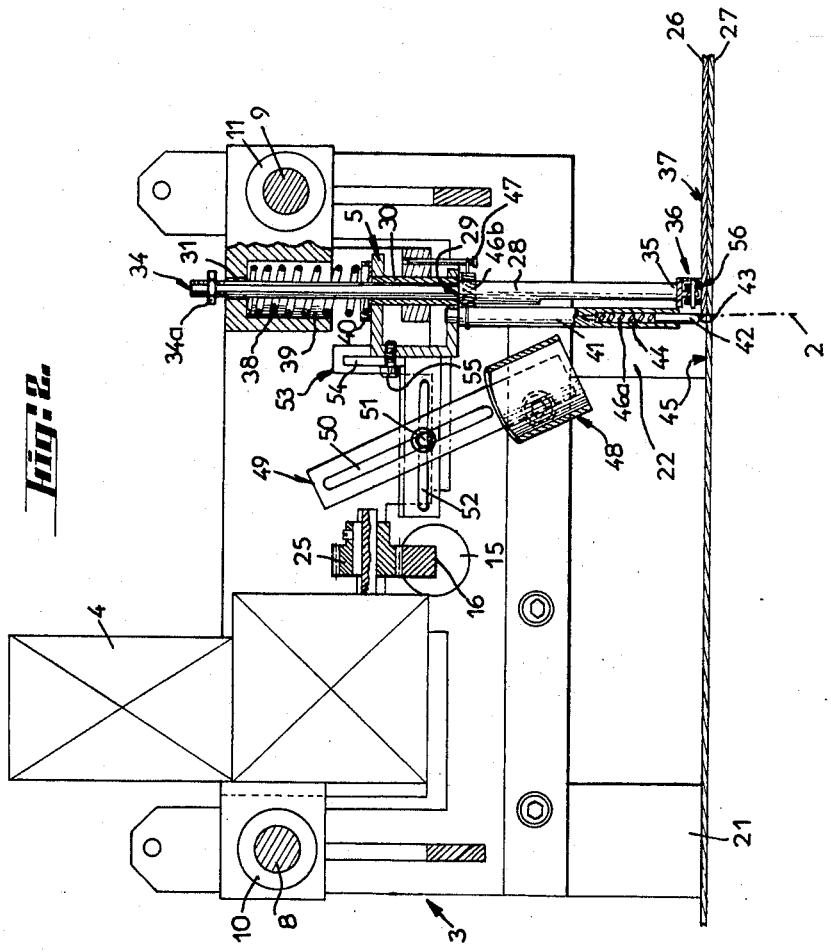

United States Patent Office 3,479,484
Patented Nov. 18, 1969

3,479,484
METHOD AND APPARATUS FOR GUIDING A TORCH IN LAP WELDING
Jean Alleaume, Saint-Cloud, France, assignor to Technigaz, Paris, France, a company of France
Filed Apr. 4, 1967, Ser. No. 628,318
Claims priority, application France, Apr. 6, 1966, 56,676
Int. Cl. B23k 9/12, 9/00
U.S. Cl. 219—125         17 Claims

ABSTRACT OF THE DISCLOSURE

Method and apparatus for joining by automatic welding a pair of respectively covering and covered metal-sheets. The sheets are first prepared so as to provide a linear lap joint by means of a tack-welding device having a pressing-down member which enables engagement with the end edge of the covering sheet. Thereafter the welding of the joint is performed in a continuous operation by means of an automatic welding apparatus having a welding torch guided for direction and distance along the joint by the oscillations imparted to feeler members in permanent engagement with the edges of said sheet.

---

The present invention essentially relates to a method of joining metal-sheets or plates by preferably automatic welding and more specifically by electric arc-welding through autogenous fusion or smelting, in particular for connecting through a lap-welded joint, two respectively covering and covered metal-sheets or plates, as well as an appliance, device, apparatus or machine for working and carrying out said method.

Automatic and semi-automatic devices for electric arc-welding are already known. Such devices enable essentially to obtain a uniform welding speed, feed or rate of travel of the arc along the connecting joint. When using such devices for autogenous fusion or smelting welding without any filler material, it is very important that the depth of penetration of the heating tip remains perfectly uniform. In respect of the particular problem of joining metal-sheets or plates by a weld performed in a continuous process, this requirement is likely to be not perfectly met, due to the fact that the edges of the metal-sheets, plates or like work parts, which are generally cut by shearing or oxygen, gas or torch cutting, often exhibit irregularities, burrs or fins. Moreover, the metal-sheets or plates to be joined together are not always absolutely flat or plane, in view of the deformations, strains, bucklings or warpings caused by the handling operations, shocks, etc. Such drawbacks are in particular to be taken into account when metal-sheets or plates are connected by a so-called lap-type joint, the guiding of the welding torch being generally effected along a straight path, substantially parallel with the edge of the covering metal-sheet or plate.

An object and aim of the present invention is to provide a process and apparatus allowing to obtain a weld bead or fillet which is substantially uniform and free from any internal defects or flaws.

The method according to the present invention is characterized in that it consists in preparing said metal-sheets or plates by tacking same, so as to provide a substantially linear joint of the aforementioned type, detecting thereafter the irregularities of the edges of said joint and simultaneously using the indications supplied by this detection for automatically guiding, with respect to the direction and distance of travel, a welding torch along said joint, said torch effecting the welding of said joint in a continuous manner.

According to further features of the method according to the present invention, the aforesaid detecting operation pendicular planes, respectively formed by the edge extending substantially at right angles to said covered metal-sheet or plate and adjacent to said joint of the covering metal-sheet or plate, and by the free or exposed face or side of said covering sheet, which is adjacent to this edge.

The apparatus for carrying out the aforementioned process comprises in particular a device for automatic welding in a continuous manner of a lap-joint of the aforesaid type, said device being of the kind including a motorized torch holder carriage or slide-rest, said carriage comprising a welding torch carrier, support or holder, mounted for movement with respect to said carriage and the displacements of said holder or support relative to said carriage being controlled by the oscillations or swinging motion imparted to at least one feeler member, kept in permanent engagement with one edge of at least one of said metal-sheets or plates, adjacent to said joint.

According to another feautre of the device for automatic welding according to the invention, said holder or support is mounted so as to be slidable along an axis substantially perpendicular to the plane of said metal-sheets or plates and rotatable or pivotable about said axis, a first feeler controlling the translative displacements of said holder and a second feeler controlling the rotary displacements of said holder, said second feeler being kept in engagement with the end edge substantially perpendicular to said covered metal-sheet and adjacent to said joint of said covering sheet, and said first feeler being kept in contact with the free or exposed face or side adjacent to said end edge of said covering sheet or plate.

It will be readily understod and appreciated that by means of this device according to the invention, the welding torch is constantly guided as well for direction as for distance of travel during its displacement or motion along the edges of the metal-sheets or plates to be welded together.

The apparatus according to the invention further comprises a spot or tack arc-welding device for said preparation of the metal-sheets or plates, said device comprising a torch carrier or holder ring or collar, integral with a guide handle and adjustable in position with respect to a pressure member bearing upon said covering sheet, said pressure member being provided with abutment means enabling the engagement of said device with the end edge of the covering metal-sheet, along which the joint has to be former.

According to still another feature of said spot or tack welding device according to the invention, said pressure member consists of a preferably bent part or element, the bearing surface of which, engaging the free or exposed surface of the covering sheet or plate, is formed with a cut-out, notch, groove or like recess adapted to encompass, surround or straddle the arc tip of the welding torch.

According to still another feature of the spot or tack welding device according to the invention, there is provided a handle enabling said pressure member to be pressed upon said covering sheet.

The invention will be better understood and further characterizing features and advantages thereof will appear as the following description proceeds with reference to the accompanying diagrammatic drawings given only by way of example and wherein:

FIGURE 1 is a general top or plan view from above of the continuously operable welding device in the apparatus according to the invention;

FIGURE 2 is a vertical cross-sectional view along the line II—II of FIGURE 1 of the same device for welding in a continuous operation;

FIGURE 3 is an exploded perspective view of the spot or tack welding device in the apparatus according to the invention;

FIGURE 4 is a fragmentary perspective view more particularly showing the position of the pressure member of the spot or tack welding device when in use or in its operating condition.

As seen on and illustrated by FIGURE 1, the device for automatic welding in a continuous manner of the apparatus according to the invention mainly consists of a stationary frame 1, the position of which is previously determined by alignment along a joint diagrammatically shown at 2 in the drawing.

According to the method of the invention, this joint 2, which is substantially linear and in particular of the lap joint type between two respectively covering and covered metal-sheets or plates, has been prepared beforehand by tacking during an operating step which for the sake of convenience of the description, will be described at the same time as and together with the device of FIGURE 3. Such a joint thus prepared does not exhibit any vertical undulations or corrugations of large amplitude and the preliminary tacking operation has removed the gapings or gaps between the covering sheet and the covered sheet.

Inside of the frame 1 is mounted a carriage 3, driven in translation in parallel relation to the joint 2 by a motor 4. The carriage 3 comprises a welding torch holder, carrier or support 5 which is moving substantially above the joint 2.

This welding torch is for instance of the type used in the arc-welding processes, for example a plasma torch or a torch with non-consumable or tungsten electrodes with inert gas shielding.

The device shown is generally adapted to joint metal-sheets or thin foils made of heat-weldable material, the thickness of which may range for example from about .012″ to about .079″ (thin sheets or foils) and from about .079″ to about .158″ (medium gauge sheet or plate). The length of the frame 1 is of course slightly above the length of the joints to be achieved by means of the device.

In the example shown, the frame 1 comprises two end plates, uprights or standards 6 and 7, connected by longitudinal bars or rods 8 and 9 fastened or bolted to these uprights or standards. The carriage 3 slides along these bars, rails or rods through the medium of bushings, sockets or sleeves such as 10 and 11, on which it is secured by means of locking or retaining rings or clips such as 12. A rack 13 is also arranged longitudinally between both standards or upright plates 6 and 7. This rack is keyed, cottered or otherwise secured by pin fasteners at its ends into the sleeves, sockets or bushes 14 and 15 which are rotatably mounted in the bearing plates, uprights or standards 6 and 7. These sockets or bushes 14 and 15 are rotatable about an axis (denoted at 16 on FIGURE 2) extending in parallel relation to the rack 13. means are provided for rotating or turning the rack through a tool or implement engageable for example into a polygonal hole 17 formed in the socket or bush 14, and locking means such as a click, catch, pallet, pawl or like detent 18 are also provided to lock or retain the rack 13 either in inoperative disengaged position, or in the operative or meshing position shown on FIGURE 1. Finally, there are shown at 19, 20, 21 and 22 base plates or like supporting members made integral with the bottom or lower ends of the upright plates or standards 7 and 8, respectively. The frame 1 rests at least by the bases 20 and 22 upon the covered or underlying sheet-metal or plate to be welded and these base members 20 and 22 form together by their faces or sides 23 and 24, matching or engaging stops or abutments bearing against the covering or overlying sheet of the joint to be achieved. Both base members 20 and 22 forming said matching or engaging abutments or engaging stops, are preferably mounted in adjustable relationship on the frame 1, so that their spacing or distance may be adjusted to fit the length of the joint to be effected.

The carriage 3, as it is more clearly seen on FIGURE 2, is provided with a motor set 4, drivingly or operatively rotating a pinion or cog-wheel 25 meshing with the rack 13. The prime mover set 4 consists for example of a small electric motor operatively connected to a speed reducing gear adapted to impart to the carriage a substantially uniform feed or speed of travel or advance. The carriage 3 moreover comprises a torch holder 5 which is movably mounted on this carriage. On the cross-sectional view of FIGURE 2, it is seen that this holder, carrier or support 5 consists of a U-shaped member, the legs of which extend in substantially parallel relation to the plane of the metal-sheets or plates denoted at 26 and 27 in the drawing. This holder 5 is rotatably movable about a sleeve 30 resting on the shoulder 29 of a shaft, spindle or axis 28. This axis or shaft 28, extending substantially at right angles to the plane of the metal-sheets or plates 26 and 27, is slidably mounted in a bore or passageway 31 formed in the carriage 3. As is shown on the plan or top view of FIGURE 1, the shaft 28 is formed with two flattened ends or portions 32 and 33 over the whole part of its length which extends between the shoulder 29 and the end 34 inserted into the passageway or bore 31. Thus, as the pasageway or bore 34 and the sleeve 30 are also formed with cross-sectional flattened portions, the shaft 28 is longitudinally slidable but held against rotation.

It is seen on FIGURE 2 that the end 35 of the shaft 28 rests through the medium of a rolling contact or engaging element 36 on the free or exposed top surface 37 of the covering or overlying sheet or plate 26 adjacent to the point 2. In this manner, all the wavy patterns or undulations of this top face or side 37 are transmitted when the carriage is advancing, progressing or moving forward or ahead on and along the rack, to the holder 5 in the form of oscillations or swinging motions substantially perpendicular to the plane of the metal-sheets or plates 26 and 27. In order to achieve a permanent or steady engagement between the element 36 and the surface 37, there is provided a drawback or return means such as a helical or coil spring 38, accommodated by or housed in a bore extension 39 of the passageway 31 and bearing upon the holder or suport 5 through the medium of the cup-shaped end 40 of the sleeve 30. The shaft 28, provided with its rolling contacting or engaging element 36, its drawback or return means 39 and a rocking or retaining nut 34a threaded on the end 34, thus forms a first member for feeling or detecting the irregularities exhibited by the joint 2 in a direction substantially perpendicular to the plane of the sheets or plates 26 and 27.

Extending in substantially parallel relation to the shaft 28, a shaft 41, threaded or screwed in that leg of the holder 5 which is nearest the joint 2, carries at its free end a finger 42 which bears sidewise against the edge 43 of the covering or overlying sheet 26. It is further seen in the drawing that the finger 42 is slidable in a recess or housing 44 formed at the end of the shaft 41, so as to bear upon the top face or side 45 of the covered or underlying sheet 27. A drawback or return member such as a helical spring 46a, arranged inside of the recess 44, enables to keep the finger 42 in permanent engagement with the surface 45. It will be understood that during the motion or displacement of the carriage, the finger 42, when meeting with or coming upon an irregularity projecting from the edge 43 of the sheet 26, will tend to rotate the holder 5 about the geometrical axis of the rod or shaft 28. The finger 42 preferably has a rounded cross-section so as to avoid being jammed or stopped by a too protruding or raising burr or beard. The free end of the finger 42 is also advantageously bevelled so as to minimize the friction on the surface 45 of the sheet 27. A drawback or return means such as a spring 46b, secured at one of its ends on the rod or shaft 41 and at its other end to an attachment 47, arranged on the carriage in an excentric position with respect to the sleeve 30, enables to constantly keep the finger 42 engaged with or applied against the edge 43 of the joint 2. It is seen that the shaft or rod 41 provided with its finger 42 and its two drawback or return means 46a, 46b, thus form a second member for feeling or detecting the irregularities the joint 2 may exhibit in a direction substantially parallel with the plane of the sheets or plates.

In view of these two feeler members, a welding torch (not shown) carried by a fastening ring, collar or socket such as 48, integral with the holder 5, will effect during the advancing motion of the carriage along the joint 2, displacements exactly corresponding to all the irregularities of the joint. The torch holder ring or collar 48 is mounted on the support 5 so as to be easily adjustable for distance and direction. In the embodiment shown, the collar or ring 48 is integral with an arm 49, formed with an elongated aperture or slot 50, engaged therethrough by a clamping or set screw 51, slidable in an elongated aperture or slot 52 of an angle bracket 53 partially shown in a perspective view on FIGURE 2. The other leg of this angle bracket is also formed with an elongated aperture or slot 54 engaged therethrough by a fastening screw 55 threaded in the support 5.

The operation of the device just described as well as the development of the operating steps of the method according to the invention are extremely simple. The sheets or plates 26 and 27 having been connected, joined or assembled beforehand by tacking, so as to provide a substantially linear joint such as shown at 2 on FIGURES 1 and 2, the frame 1 is adjusted in position so as to bear at least by its bases 20 and 22 upon the sheet 27 and so that the abutment faces or sides 23 and 24 meet with or come upon the edge 43 of the covering or overlying sheet 26 at both ends of the joint 2. The welding torch being mounted in its holding collar or ring 48, a preliminary adjustment of the position of this torch is then effected for direction and distance with respect to the joint 2, so as to promote and achieve the heat penetration suited to the weld to be made. This adjustment having been carried out, and the screws 51 and 55 being tightened, the carriage is brought or moved to the end of the frame, for example towards the standard or upright plate 6. In this position, the finger 42 bears against the edge 43 of the sheet 26 and upon the surface or side 45 of the sheet 27. It should be checked that the rolling element 36 bears correctly upon the face or side 37 of the sheet 26 (in the example shown, this rolling element 36 consists for example of a small plate extending substantially parallel to the joint 2 and on which are journalled three aligned pairs of small rolls 56). Owing to the strong action of the spring 38, which has to be powerful enough for this purpose, both sheets or plates are firmly or strongly pressed against each other through the medium of the guiding member 36 at the very place or spot where the welding arc is to be struck. The torch having been energized to strike the arc and the motor having been switched on to start, the pinion 25, meshing with the rack 13, continuously moves the carriage 3 ahead or forward and the weld is being effected all along the joint 2. When the carriage has reached the other end of the frame, towards the upright plate or standard 7, the electric current is switched out or cut off and the rack is unlocked at 18 so that it may be rotated about its axis 16 by means of a tool or implement inserted in the hole 17. The teeth of the pinion 25 and the rack 13 offer a sufficient clearance at their tips to allow disengagement from each other and the rack is disengaged or made inoperative. The carriage 3 is then moved back by hand to its initial position.

On FIGURE 3 is shown an illustrative embodiment of the device used in the apparatus according to the invention for the preliminary tacking of the sheets. This device essentially comprises a torch holder ring or collar 57, diagrammatically shown in the drawing and which may comprise adjustable clamping or tightening means. This collar 57 is advantageously completed with an inner ring or bushing made of resilient material. This collar 57 is further integral with a guiding handle diagrammatically shown at 58 with parts broken away and with a guiding portion 59 in the opening 60 of which may slide but not rotate a threaded member 61 formed with two flattened portions 62, 63. This member 61 comprises at one end an orifice 64 for example threaded or tapped and adapted to receive the threaded spindle or rod 65 of a pressing-down handle 66 and at its other end, a lug, tab, feather or cog 67, formed with an elongated aperture or slot 68 extending at right angles to the longitudinal direction of the element 61. This lug 67 is inserted into a slot or groove 69, of corresponding clevis shape, formed in a pressing-down member 70, adapted to press the covering or overlying sheet down onto the covered or underlying sheet when preparing the joint. A clamping or set screw 71 threaded into a pair of coaxially aligned or registering holes 72 and 73 formed in the legs 74 and 75a of the clevis portion of the member 70, and also engaging into the elongated aperture or slot 68, enables to adjust the pressing-down member 70 in position with respect to the threaded element 61. The adjustment in a direction perpendicular to this elongated slot 68, is effected by slidably moving the threaded element 61 in the orifice 60, said element being locked or securely fastened by means of the pair of clamping or tightening nuts 75 and 76 engaging the member 59. In order to promote and assists the guiding of the member 61 within the orifice 60, the member 61 is provided on its forward or front portion with a T-shaped groove 77, adapted to receive a head portion 78 integral with a threaded part 79 threaded into the forward or front portion of the member 59. A clamping or tightening nut 80 enables to hold or retain the element 79 within the member 59 in position in a direction perpendicular both to the longitudinal direction of the threaded member 61 and to the longitudinal direction of the opening 68. The pressing-down member 70 may thus be adjusted in position along three orthogonal directions with respect to the welding torch diagrammatically shown at XX' on FIGURE 3.

The perspective view of FIGURE 4 more clearly shows the operation of the pressing-down member 70 during the tacking step. It is seen that the pressing-down member 70 of a generally bent shape, has a flat bearing face 81 adapted to be engaged with the free or exposed top face or side 37 of the covering or overlying sheet 26. This flat portion 81 is cut out or recessed at 82, so as to encompass or surround the tip of the arc of the welding torch, which tip is diagrammatically shown by an arrow on FIGURE 4. Projecting abutments 83 and 84 are moreover provided on either side of the cut-out or recess 82, on the face 83, to engage or bear against the edge 43 of the covering or overlying sheet or plate 26. In this manner, the pressing-down member 70 which is substantially similar to a kind of presser-foot, and the whole torch holder device shown on FIGURE 3, integral with this pressing-down member 70 are accurately positioned wtih respect to the joint to be desirably effected.

The operation of this device may be easily inferred from the above description. The sheets or plates 26 and 27 being arranged in overlying relationship in the position where they have to be joined, the pressing-down member or presser-foot 70 is placed in the position shown on FIGURE 4 and an adjustment is at first carried out to obtain correct distance and direction of the tip of the welding torch. The device thus adjusted is then brought into engagement with the edge of the sheet or plate 26 at a first location or position, by means of the depending or downward projecting abutments 83 and 84 of the pressing-down member 70 and is simultaneously strongly or firmly pressed upon the top face or side 37 of this sheet under the action of the force exerted or applied on the pressing-down handle 66. A strong or firm contact is thereby obtained between the sheets or plates 26 and 27 at the selected tacking or welding point or spot. The like operation is then effected for a series of spaced points distributed all along the joint 2, so as to remove any gaps along this joint between the sheets 26 and 27.

Many modifications and alterations may be brought to the apparatus described hereinabove without departing from the scope or principle of the invention; thus for example the frame 1 may be arranged for allowing continuous welding of corrugated sheets by providing base members 20 and 22 engageable into a corrugation trough of the sheet. There may be provided a friction contact for the element 36, an automatic or self-acting disengaging arrangement for the rack 13 at the end of the travel of the carriage, etc.

It is understood that the invention should not be construed to be limited to the species or forms of embodiments described and shown which have been given by way of example only, as many modifications may be brought thereto by those skilled in or conversant with the art within the scope defined by the appended claims.

What I claim is:

1. A substantially automatic welding apparatus for continuously connecting a pair of covering and covered sheets respectively along a lap joint and comprising a motorized torch holder carriage and a welding-torch holder mounted for movement with respect to said carriage, oscillating feeler means for controlling the displacements of said torch holder with respect to said carriage, said feeler means following a path adjacent and substantially conforming to said joint, whereas said torch holder is mounted so as to be slidable along an axis substantially perpendicular to the plane of said sheets and to be rotatable about said axis, said feeler means including a first feeler member monitoring the translative motions of said torch holder with respect to said carriage and a second feeler member monitoring the rotary displacements of said torch holder, said second feeler member being kept in engagement with the end edge of said covering sheet and being held against said edge by resilient return means, which edge is substantially at right angles to said covered sheet and adjacent to said joint, whereas said first feeler member is kept in engagement with the free face of said covering sheet, adjacent to said end edge.

2. An apparatus according to claim 1, characterized in that said second feeler member is kept resiliently in engagement with said free face adjacent to said end edge of said covered sheet.

3. An apparatus according to claim 2, characterized in that said first feeler member consists of a slide element in rolling engagement with and resiliently pressed on the free surface of said covering sheet and arranged at the end of a rod slidably mounted on said carriage and driving said torch holder in translation.

4. An apparatus according to claim 3, characterized in that said second feeler member consists of a slider element in preferably sliding engagement with said end edge of said covering sheet and resiliently pressed upon the free adjacent surface of said covered sheet and mounted at the end of a rod integral with said torch holder and movable in rotation in coaxial relation to said first feeler member.

5. An apparatus according to claim 4, characterized in that said welding torch is arranged to be adjustable in position preferably in three substantially orthogonal directions, on said holder.

6. An apparatus according to claim 5, characterized in that said carriage is slidably mounted on a pair of substantially parallel spaced guide rails, having a length substantially equal to that of said joint, said rail being integral with a stationary frame resting upon said covering sheet and provided with a pair of abutments adjustable in position relative to said frame and bearing at each end of said joint, respectively, against said end edge of the covering sheet.

7. An apparatus according to claim 6, characterized in that said carriage comprises a motor, which drives a pinion meshing with a rack mounted on said frame and extending in parallel relation to said guide rails, said rack being so arranged as to be rotatable about an axis substantially parallel to its longitudinal direction and having an eccentric position with respect to said rack.

8. A welding apparatus according to claim 1 comprising a tack-welding device for preparing a substantially linear lap-joint between a covering and a covered metal sheet, said device being removably mounted inside said welding apparatus and including a torch-holding collar integral with a guiding handle and adjustable in position with respect to a pressing down member to be pressed upon said covering sheet by said handle, said pressing-down member consisting of a bent element, the bearing surface of which is formed with a cut out adapted to encompass the tip of said welding torch, and being provided with abutments means enabling the engagement of said device with the end edge of said covering sheet, along which said joint has to be effected.

9. A welding apparatus according to claim 8, wherein said tack-welding device includes a torch-holding collar integral with a guiding portion in the opening of which may slide a threaded member comprising at one end an orifice adapted to receive said handle adjustable in position with respect to said pressing-down member and at its other end a lug which is inserted into a clevis portion of said pressing-down member.

10. A welding apparatus according to claim 9, wherein said tack-welding device includes a threaded slidable member, the lower portion of which comprises a lug formed with an elongated aperture extending at right angles to the longitudinal direction of said lug and fitted into a clevis portion of corresponding shape formed in said pressing-down member, whereas a screw engages said clevis portion and said elongated aperture so as to adjust said pressing-down member in position with respect to said slidable element.

11. A substantially automatic welding apparatus for continuously connecting a pair of covering and covered sheets respectively along a substantially linear lap joint, comprising a motorized carriage movable over said covering sheet in parallel relation to said lap-joint and a welding-torch holder mounted on and movable with respect to said carriage so as to be slidable in translation along and rotatable about an axis substantially normal to said sheets, said apparatus comprising first feeler means monitoring the translative motions of said torch holder, and second feeler means monitoring the rotary displacements of said torch holder, said second feeler means continuously engaging the edge of said covering sheet adjacent to said lap-joint, whereas said first feeler means continuously engage the free exposed face of said covering sheet.

12. An apparatus according to claim 11, characterized in that said second feeler member is kept resiliently in engagement with said free face adjacent to said end edge of said covered sheet.

13. An apparatus according to claim 12, characterized in that said first feeler member consists of a slide element in rolling engagement with and resiliently pressed on the free surface of said covering sheet and arranged at the end of a rod slidably mounted on said carriage and driving said torch holder in translation.

14. An apparatus according to claim 13, characterized in that said second feeler member consists of a slider element in preferably sliding engagement with said end edge of said covering sheet and resiliently pressed upon the free adjacent surface of said covered sheet and mounted at the end of a rod integral with said torch holder and movable in rotation in coaxial relation to said first feeler member.

15. An apparatus according to claim 14, characterized in that said welding torch is arranged to be adjustable in position preferably in three substantially orthogonal directions, on said holder.

16. An apparatus according to claim 15, characterized in that said carriage is slidably mounted on a pair of substantially parallel spaced guide rails, having a length substantially equal to that of said joint, said rails being integral with a stationary frame resting upon said covering sheet and provided with a pair of abutments adjustabe in position relative to said frame and bearing at each end of said joint, respectively, against said end edge of of the covering sheet.

17. An apparatus according to claim 16, characterized in that said carriage comprises a motor, which drives a pinion meshing with a rack mounted on said frame and extending in parallel relation to said guide rails, said rack being so arranged as to be rotatable about an axis substantially parallel to its longitudinal direction and having an eccentric position with respect to said rack.

References Cited

UNITED STATES PATENTS

| | | | |
|---|---|---|---|
| 1,237,915 | 8/1917 | Lachman | 219—86 |
| 2,724,036 | 11/1955 | Hess | 219—125 |
| 2,827,548 | 3/1958 | Griswold | 219—125 |
| 2,836,704 | 5/1958 | Mason | 219—125 |
| 3,387,356 | 6/1968 | Clark | 219—137 |

JOSEPH V. TRUHE, Primary Examiner

L. A. SCHUTZMAN, Assistant Examiner

U.S. Cl. X.R.

219—137